(12) United States Patent
Otake (10) Patent No.: US 9,555,785 B2
(45) Date of Patent: Jan. 31, 2017

(54) BRAKE FLUID PRESSURE CONTROL UNIT

(71) Applicant: ADVICS CO., LTD., Kariya (JP)

(72) Inventor: Tsuyoshi Otake, Obu (JP)

(73) Assignee: ADVICS CO., LTD., Kariya, Aichi-Pref. (JP)

( * ) Notice: Subject to any disclaimer, the term of this patent is extended or adjusted under 35 U.S.C. 154(b) by 103 days.

(21) Appl. No.: 14/397,440

(22) PCT Filed: Apr. 26, 2013

(86) PCT No.: PCT/JP2013/062362
§ 371 (c)(1),
(2) Date: Oct. 27, 2014

(87) PCT Pub. No.: WO2013/161988
PCT Pub. Date: Oct. 31, 2013

(65) Prior Publication Data
US 2015/0123459 A1    May 7, 2015

(30) Foreign Application Priority Data

Apr. 27, 2012   (JP) ................. 2012-102993

(51) Int. Cl.
*B60T 8/34*         (2006.01)
*B60T 8/32*         (2006.01)
(Continued)

(52) U.S. Cl.
CPC .............. *B60T 8/346* (2013.01); *B60T 8/3225* (2013.01); *B60T 8/368* (2013.01); *B60T 15/028* (2013.01)

(58) Field of Classification Search
CPC ...... B60T 8/3675; B60T 8/368; B60T 15/028; B60T 17/04; B60T 17/046; B60T 13/16
(Continued)

(56) References Cited

U.S. PATENT DOCUMENTS 6,234,199 B1 * 5/2001 Nohira .................... B60T 8/368
                                                           137/557
2005/0242660 A1 * 11/2005 Rouillard .............. B60T 8/3655
                                                           303/119.1
(Continued)

FOREIGN PATENT DOCUMENTS

DE   10 2006 026 872 A1   12/2007
JP       2006-111245 A     4/2006
(Continued)

OTHER PUBLICATIONS

International Search Report (PCT/ISA/210) mailed on Jul. 16, 2013, by the Japanese Patent Office as the International Searching Authority for International Application No. PCT/JP2013/062362.

(Continued)

*Primary Examiner* — Thomas J Williams
*Assistant Examiner* — James Hsiao
(74) *Attorney, Agent, or Firm* — Buchanan Ingersoll & Rooney PC (57) ABSTRACT

A brake fluid pressure control unit for a vehicle comprises: a hydraulic block that includes a housing containing an internal channel for a first system and an internal channel for a second system, which individually allow communication with a wheel cylinder for a first wheel and a wheel cylinder for a second wheel respectively, and also containing a detected hydraulic pressure inlet hole leading to a pressure receiving part of a pressure sensor. A first hole included in the internal channel for the first system and a second hole included in the internal channel for the second system can selectively be connected to the detected hydraulic pressure inlet hole by machining such that the depth of either the first hole or the second hole is made greater than the other.

16 Claims, 10 Drawing Sheets

(51) Int. Cl.
*B60T 8/36* (2006.01)
*B60T 15/02* (2006.01)
(58) Field of Classification Search
USPC .............................................. 303/9.61, 119.3
See application file for complete search history.

(56) References Cited

U.S. PATENT DOCUMENTS

| | | | |
|---|---|---|---|
| 2006/0055232 A1* | 3/2006 | Koyama | B60T 8/3685 303/10 |
| 2007/0176484 A1* | 8/2007 | Reuter | B60T 8/368 303/10 |
| 2008/0106145 A1* | 5/2008 | Hinz | B60T 8/3225 303/152 |
| 2010/0138126 A1* | 6/2010 | Koyama | B60T 8/368 701/70 |
| 2010/0201183 A1* | 8/2010 | Gruendl | B60T 8/4018 303/11 |
| 2010/0207446 A1* | 8/2010 | Tandler | B60T 8/368 303/10 |
| 2010/0231033 A1* | 9/2010 | Gastauer | B60T 8/4031 303/10 |
| 2010/0247362 A1* | 9/2010 | Koizumi | B60T 8/368 418/140 |
| 2010/0264723 A1 | 10/2010 | Atsushi et al. | |
| 2010/0270855 A1* | 10/2010 | Sawada | B60T 8/1764 303/113.2 |
| 2010/0276925 A1* | 11/2010 | Bareiss | B60T 8/368 285/125.1 |

FOREIGN PATENT DOCUMENTS

| | | |
|---|---|---|
| JP | 2008-030550 A | 2/2008 |
| JP | 2008-030551 A | 2/2008 |
| JP | 2008-030552 A | 2/2008 |
| JP | 2008-105628 A | 5/2008 |
| JP | 2009-298379 A | 12/2009 |
| JP | 2010-280269 A | 12/2010 |
| WO | WO 2009/057594 A1 | 5/2009 |

OTHER PUBLICATIONS

Written Opinion (PCT/ISA/237) mailed on Jul. 16, by the Japanese Patent Office as the International Searching Authority for International Application No. PCT/JP2013/062362.

Extended European Search Report dated Jul. 30, 2015, issued by the European Patent Office in the corresponding European Application No. 13780538.8. (8 pages).

* cited by examiner

Fig. 13 the present invention relates to a brake fluid pressure control unit for a vehicle, which is designed such that a hydraulic block (housing) incorporating pressure regulating elements for brake fluid is standardized at the stage of processing (i.e., products before finishing process).

BRAKE FLUID PRESSURE CONTROL UNIT

TECHNICAL FIELD

The present invention relates to a brake fluid pressure control unit for a vehicle, which is designed such that a hydraulic block (housing) incorporating pressure regulating elements for brake fluid is standardized at the stage of processing (i.e., products before finishing process).

BACKGROUND ART

A brake fluid pressure control unit for a vehicle is configured by combining: a hydraulic block incorporating a pump for power drive, pressure increase valves and pressure reduction valves, a pressure sensor, and a reservoir used for taking in brake fluid discharged via the pressure reduction valve from wheel cylinders (wheel brakes) and for supplying it to the pump; an electronic device equipped with an ECU (Electronic Control Unit) that controls driving a motor, the pressure increase valves, and the pressure reduction valves; and the motor that drives the pump. A known example for the brake fluid pressure control unit is disclosed in, for example, the Patent Document 1 described below.

The brake fluid pressure control unit described in the document is used in a two-wheeled vehicle. In the unit, a pair of accommodating holes, right and left, for corresponding pressure increase valves and a pair of accommodating holes, right and left, for corresponding pressure reduction valves are arranged on one face of the housing of a hydraulic block such that the one pair is above the other.

Additionally, a pressure sensor accommodating hole is disposed among the four valve accommodating holes. A motor terminal hole extending from one face to the other of the housing is located above the pressure sensor accommodating hole, and the motor terminal is extended through the hole, thereby electrically connecting an electronic control unit attached to the one face of the housing and the motor attached to the other face thereof.

Furthermore, hydraulic pressures on the downstream side (on the wheel cylinder side) from the pressure increase valves and pressure reduction valves are detected by the pressure sensor.

PRIOR ART DOCUMENT

Patent Document

Patent Document 1: WO2009/057594 A1

SUMMARY OF THE INVENTION

Object of the Invention

In the brake fluid pressure control unit described in the Patent Document above, the motor terminal hole is disposed in the upper part of the housing for the hydraulic block. Therefore, the pressure sensor accommodating hole cannot be connected to a master cylinder connection hole formed in the upper part of the housing (i.e., the motor terminal hole blocks the formation of a communication hole). As a result, the hydraulic pressure on the upstream side (on the master cylinder side) from the pressure increase valves and pressure reduction valves cannot be detected by the pressure sensor.

The pressure sensor is installed to enhance hydraulic control. However, in a brake fluid pressure control unit for a two-wheeled vehicle in particular, points at which hydraulic pressure is detected may have to be set on the vehicle wheel sides (on the wheel cylinder sides), on the pressuring source sides (on the master cylinder sides), in a front wheel system, and in a rear wheel system, depending on the specifications or control purposes of the vehicle, the attached position of the brake fluid pressure control unit with respect to the vehicle, or the like.

Where hydraulic blocks are independently designed for these setting aspects, the housings to be controlled increase, making it difficult to standardize processes, with the result that adverse effects may be exerted on productivity and cost. The structure in the Patent Document 1 cannot cope with this problem.

Accordingly, an object of the present invention is to standardize housings for corresponding hydraulic block at the stage of processing, thereby achieving a cost reduction, and so on.

Means to Achieve the Object

In order to achieve the above object, in the present invention, a brake fluid pressure control unit for a vehicle comprises a hydraulic block described below. That is, the hydraulic block includes a housing containing an internal channel for a first system and an internal channel for a second system by which incorporated pumps and corresponding external pressurizing sources are allowed to individually communicate with a wheel cylinder for a first wheel and a wheel cylinder for a second wheel, respectively, via corresponding pressure increase valves, and also containing a detected hydraulic pressure inlet hole leading to a pressure receiving part of a pressure sensor. In the hydraulic block, the internal channel for the first system and the internal channel for the second system can selectively be connected to the detected hydraulic pressure inlet hole by machining such that the depth of either a first hole or a second hole composing the corresponding internal channel is made greater than the other.

As a detailed aspect, a brake fluid pressure control unit for a vehicle comprises a hydraulic block that includes a housing containing an internal channel for a first system and an internal channel for a second system by which incorporated pumps and corresponding external pressurizing sources are allowed to individually communicate with a wheel cylinder for a first wheel and a wheel cylinder for a second wheel, respectively, via corresponding pressure increase valves, and also containing a detected hydraulic pressure inlet hole leading to a pressure receiving part of a pressure sensor; and wherein the detected hydraulic pressure inlet hole crosses either a first hole included in the internal channel for the first system or a second hole included in the internal channel for the second system, and is disposed on a line extending from the other, thereby connecting only one of the first and second holes to the detected hydraulic pressure inlet hole through machining such that the depth of this hole is increased.

In the case of a two-wheeled vehicle, one of the first and second wheels referred to here indicates the front wheel, and the other, the rear wheel. In the case of a four-wheeled vehicle, the first wheels indicate either left and right front wheels or left and right rear wheels or either the right front wheel and the left rear wheel or the left front wheel and the rear front wheel.

The hydraulic block which is used in the brake fluid pressure control unit according to the present invention, is preferably one of the following hydraulic block.

(1) a hydraulic block wherein the housing has, in one end face thereof, pressure increase valve accommodating holes, pressure reduction valve accommodating holes, and a pressure sensor accommodating hole, and has, in both side faces thereof, two opposite pump accommodating holes. The housing also has, in a lower face thereof, reservoir installation holes that take in corresponding brake fluids discharged from the corresponding wheel cylinders via the corresponding pressure reduction valves and that supply them to the corresponding pumps, and has, in an upper face thereof, pressurizing source ports that connect to the corresponding external pressurizing sources, and wheel cylinder ports that individually connect to the corresponding wheel cylinders for the first wheel and the second wheel respectively. The first hole and the second hole are provided opposite each other in both side faces of the housing. The detected hydraulic pressure inlet hole is disposed so as to meet either the first hole or the second hole and vertically cross the line extending from the other.

(2) a hydraulic block wherein the first hole and the second hole are composed of corresponding holes connecting the corresponding pressurizing source ports and the respective discharging ports of the corresponding pumps.

(3) a hydraulic block wherein the first hole and the second hole are composed of corresponding holes connecting the following three: the corresponding pressure increase valves, the corresponding pressure reduction valves, and the corresponding wheel cylinder ports.

(4) a hydraulic block wherein the pressurizing source ports and the wheel cylinder ports are arranged so as to be displaced in the respective axial directions of the corresponding pressure increase valves, and wherein, of the pressurizing source ports and wheel cylinder ports, those located farther than the others from an opening of the pressure sensor accommodating hole in the axial directions of the corresponding pressure increase valves are connected to the pressure sensor accommodating hole via a horizontal auxiliary hole extending in the axial directions of the corresponding pressure increase valves, which hole is included in the detected hydraulic pressure inlet hole.

(5) a hydraulic block wherein the horizontal auxiliary hole is located away from an imaginary straight line connecting the respective centers of the pressure increase valve accommodating holes of the first system and second system respectively in a figure viewed from the respective axial directions of the pressure increase valves, or an imaginary straight line connecting the respective centers of the pressure reduction valve accommodating holes of the first system and second system respectively.

(6) a hydraulic block wherein a motor terminal hole through which a motor terminal is extended from an electronic control unit, which is attached to one face of the housing, to a motor for driving the pumps, which is attached to the other face thereof, extends from the one face to the other of the housing. The motor terminal hole is disposed opposite the side where the detected hydraulic pressure inlet hole, the first hole, and the second hole are located using the pressure sensor accommodating hole as a position reference, in a figure viewed from the axial direction of the pressure sensor accommodating hole.

Effects of the Invention

In the brake fluid pressure control unit according to the invention, the internal channel for the first system and the internal channel for the second system provided in the housing of the hydraulic block can be selectively connected to the same pressure sensor by machining to increase the depths of the internal channels. Therefore, in terms of detecting pressures at the total of four points, which are the respective upstream points and downstream points of the pressure increase valve in the system, the housings for the corresponding hydraulic blocks can be standardized at the stage of processing. For example, it is possible to standardize the housings into one type.

In the standardized housing, requirements for the specifications of the different detecting points can be satisfied. Accordingly, it is possible to standardize the housings and hence processes, thus improving productivity and reducing costs.

The detected hydraulic pressure inlet hole is disposed so as to meet either one the first or second holes composing the internal channels for the first and second systems respectively and also disposed on the line extending from the other. Thereby, hydraulic pressure can be detected in only one of the first and second holes. Selecting the first or second hole to meet the detected hydraulic pressure inlet hole makes it possible to change a detection point for hydraulic pressure.

In this structure, the first hole and the second hole can be provided opposite each other, thus increasing use efficiency of the arrangement of space in the housing and reducing the size of the housing.

Additionally, in the configuration in which the first hole and the second hole are provided opposite each other and the detecting hydraulic pressure inlet hole is disposed vertically across the first and second holes, the first and second holes and the detected hydraulic pressure inlet hole can be located in different positions vertically, which makes it possible to increase freedom in the layout of the internal channels, facilitating a further reduction in size of the housing.

In the configuration in which the first hole and the second hole are composed of the corresponding holes connecting the corresponding pressurizing ports and the respective discharging ports of the corresponding pumps or the configuration in which the first hole and the second hole are composed of the corresponding holes connecting the following three, i.e., the corresponding pressure increase valves, the corresponding pressure reduction valves, and the corresponding wheel cylinder ports, the pressure sensor can be connected to the detection points by using holes located as parts of the corresponding internal channels for the first and second systems. Accordingly, machining and space for arrangement can be reduced, compared to the form in which dedicated holes are newly provided.

In the configuration in which the pressurizing source ports and the wheel cylinder ports are provided so as to be displaced in the respective axial directions of the corresponding pressure increase valves and in which, of the pressurizing ports and wheel cylinder ports, those ports located farther away than the others from the opening of the pressure sensor accommodating hole in the axial directions of the corresponding pressure increase valves are connected to the pressure sensor accommodating hole via the horizontal auxiliary hole extending in the axial directions of the corresponding pressure increase valves, the horizontal auxiliary hole can be located away from the imaginary straight line connecting the respective centers of the pressure increase valve accommodating holes for the first and second systems and the imaginary straight line extending from the respective centers of the pressure reduction valve accommodating holes for the first and second systems, in a figure viewed from the axial directions of the pressure increase valves.

The horizontal auxiliary hole is located at a point avoiding the space between the respective pressure increase valve accommodating holes or the respective pressure reduction valve accommodating holes for the first and second systems, or located at a point where the spaces between the respective pressure increase valve accommodating holes and the respective pressure reduction valve accommodating holes for the first and second systems are wide. Thereby, a decrease in the housing thickness between the valve accommodating holes can be restricted. Accordingly, the size of the housing can be reduced by decreasing the distance between the respective pressure increase valve accommodating holes and respective pressure reduction valve accommodating holes for the first and second systems.

In the configuration in which the motor terminal hole, which is provided in the housing, is disposed opposite the side where the detected hydraulic pressure inlet hole, the first hole, and the second hole are located using the pressure sensor accommodating hole as a position reference, in a figure viewed from the axial direction of the pressure sensor accommodating hole, connection of the hydraulic pressure detection points with the pressure sensor accommodating hole can be carried out in the upper part of the housing. Accordingly, the common pressure sensor can selectively be connected to one of the total of the four detecting points (upstream points and downstream points having, as references, the respective pressure increase valves in the internal channels for the first and second systems) more easily.

BRIEF DESCRIPTION OF THE DRAWINGS

FIG. 7(*a*) is an oblique view of a principal part in which a detected hydraulic pressure inlet hole is connected to one pressurizing source port, as viewed from the motor mounting hole side, FIG. 7(*b*) is an oblique view of the same state, as viewed from the pressure sensor accommodating hole side.

EMBODIMENTS OF THE INVENTION

An embodiment of a brake fluid pressure control unit according to the present invention will be described below with reference to FIGS. 1 to 13 in the attached drawings. FIG. 13 shows an example of a brake fluid pressure control unit for a two-wheeled vehicle. This brake fluid pressure control unit 20 includes pressurizing sources $22\_1$, $21\_2$ (i.e., master cylinders in FIG. 13) activated by operating the left and right brake levers $21\_1$, $21\_2$ of the two-wheeled vehicle. These pressurizing sources $22\_1$, $22\_2$ are able to produce hydraulic pressures independently by individually operating the brake levers $21\_1$, $21\_2$ in the same order as above.

Additionally, the brake fluid pressure control unit 20 includes: hydraulic passages $24\_1$, $24\_2$ for first and second hydraulic systems, respectively, reaching to the wheel cylinders $23\_1$, $23\_2$, respectively; pumps (piston pumps or gear pumps) $25\_1$, $25\_2$ installed in the first and second hydraulic systems respectively; a motor 26 that drives both the pumps; and pressure increase valves (electromagnetic valves) $27\_1$, $27\_2$ incorporated in the first and second hydraulic systems, respectively, further downstream from the junction of hydraulic passages, which leads to a pump discharging port.

Additionally, the brake fluid pressure control unit 20 includes: pressure reduction valves (i.e., also, electromagnetic valves) $29\_1$, $29\_2$ incorporated in discharging passages $28\_1$, $28\_2$, respectively, branching from the hydraulic passages $24\_1$, $24\_2$, respectively; reservoirs $30\_1$, $30\_2$ that temporarily accumulate brake fluids discharged from the wheel cylinders $23\_1$, $23\_2$, respectively, via the corresponding pressure reduction valves and that supply the brake fluids to the pumps $25\_1$, $25\_2$ respectively; pressure sensors 31; and an electronic control unit 32 that determines the necessity of pressure regulation for each wheel cylinder based on information from various sensors (not shown) detecting the vehicle behaviors, and that commands the motor, pressure increase valves, or pressure-decreasing valves to operate. In addition to these, dampers (not shown) for damping pulsation are incorporated in the discharging passages of the corresponding pumps, as needed.

In the case of the brake with the circuit configuration exemplified above, the hydraulic block of the brake fluid pressure control unit according to the invention is configured by mounting the elements in the chain-line frame in FIG. 13 into a housing. The pumps, pressure increase valves, pressure reduction valves, pressure sensors, and reservoirs that are all mounted in the housing, and the motor that is fitted to the hydraulic block and drives the pumps incorporated in the housing, are explained in the Patent Document 1 described above. Therefore, drawings thereof are omitted, and only the housing for the hydraulic block, which characterizes the present invention, will be shown and described. In the attached drawings, screw holes and so on for attaching the electronic control unit and motor are omitted.

A housing 1 shown in FIGS. 1 to 6 includes: pressure increase valve accommodating holes $2\_1$, $2\_2$; pressure reduction valve accommodating holes $3\_1$, $3\_2$; a pressure sensor accommodating hole 4; pump accommodating holes $5\_1$, $5\_2$; reservoir installation holes $6\_1$, $6\_2$; pressurizing source ports (ports in the drawings, to be connected to the corresponding master cylinders are called master cylinder ports) $7\_1$, $7\_2$; wheel cylinder ports $8\_1$, $8\_2$; an internal channel $9\_1$ for a first system and an internal channel $9\_2$ for a second system; detected hydraulic pressure inlet holes 10 leading to the pressure receiving parts (pressure sensor accommodating holes 4) for the pressure sensors; and a motor mounting hole 11, which accommodates the output shaft of the motor and an eccentric cam attached to the shaft.

Figure 1:
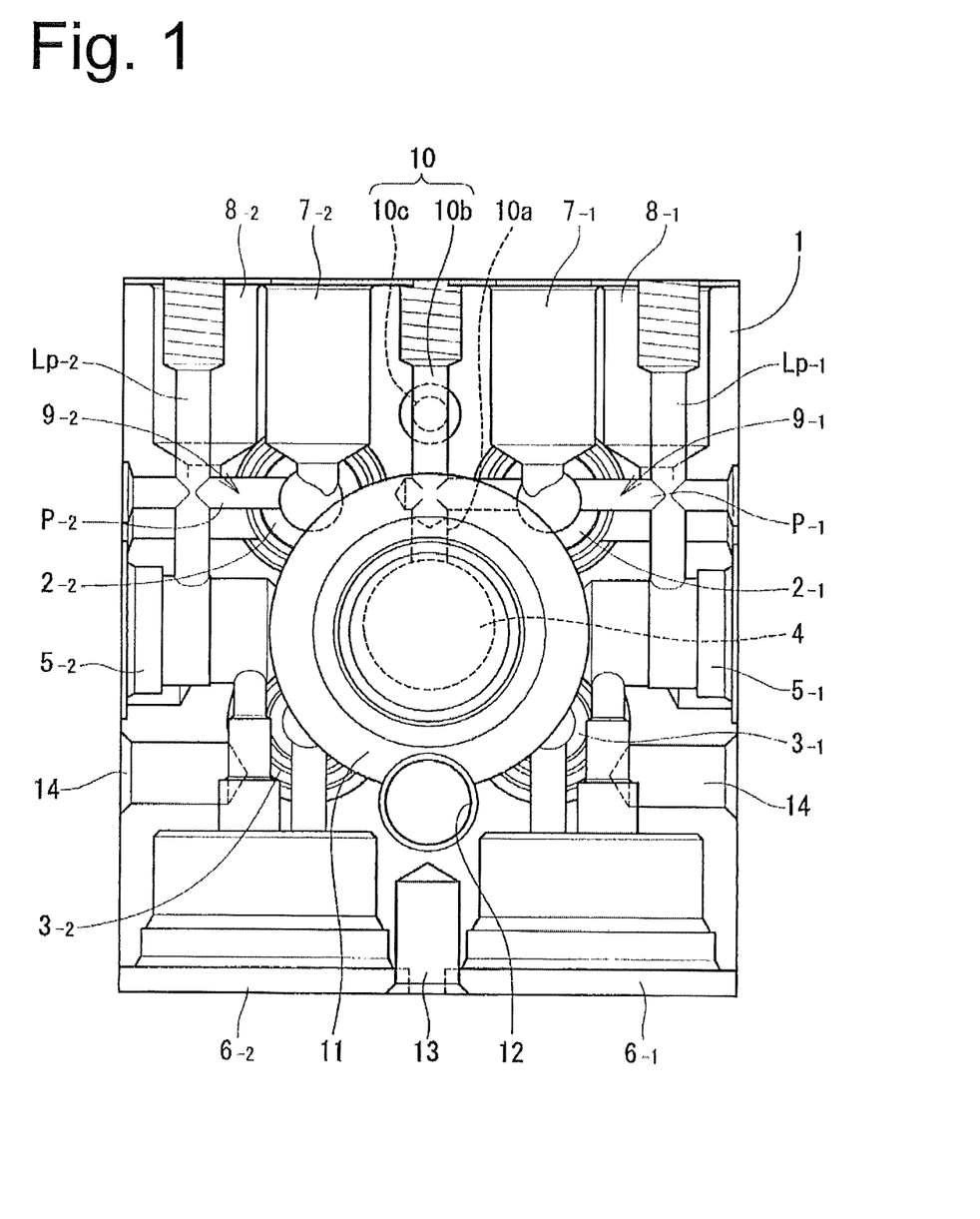
FIG. 1 is a perspective front view of a housing for a hydraulic block of a brake fluid pressure control unit according to the invention.
Figure 2:
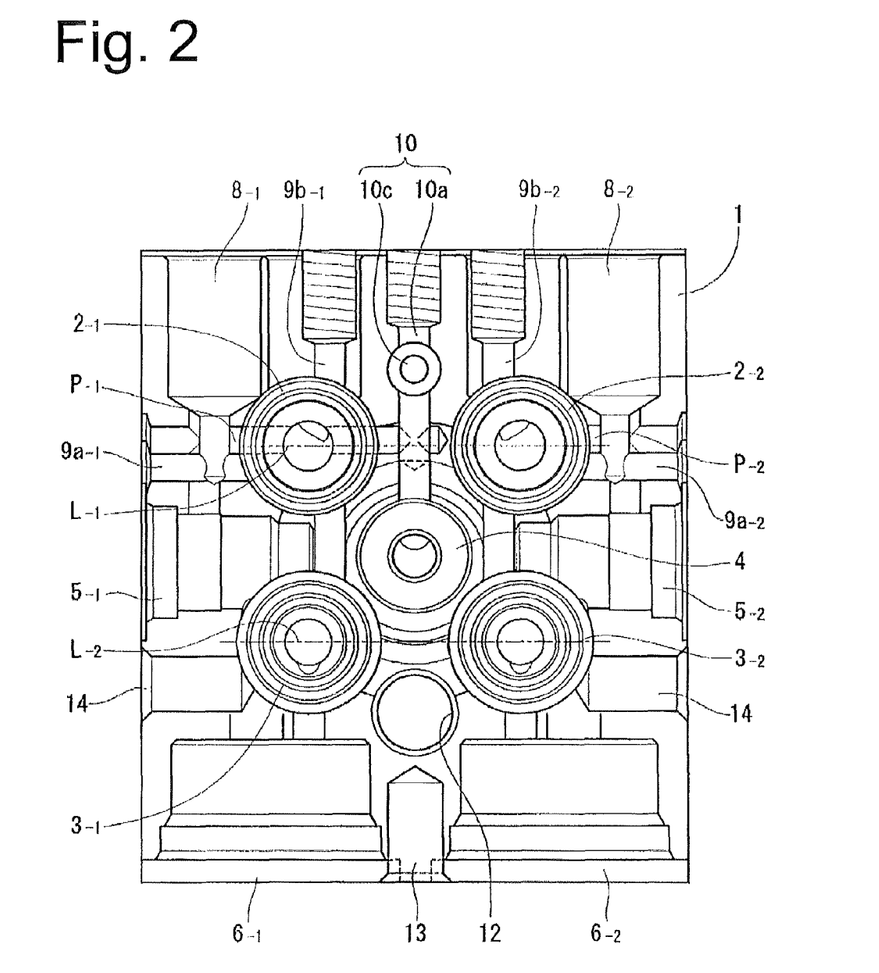
FIG. 2 is a perspective rear view of the housing shown in FIG. 1.

The housing 1 also has a motor terminal hole 12 through which a motor terminal is extended for electrically connecting the electronic control unit (not shown), which is attached to one face (the side where insertion holes for the pressure increase valve and pressure reduction valve are located), and the motor (also not shown) for driving the pumps, which is attached to the other face side. The motor terminal hole 12 extends through the housing 1 from the one face to the other.

In the housing 1 shown, the motor terminal hole 12 is disposed opposite the side where the detected hydraulic pressure inlet hole 10, the first hole $P\_1$, and the second hole $P\_2$, described below, are located (i.e., below the pressure sensor accommodating hole 4 in FIG. 2), using the pressure sensor accommodating hole 4 as a position reference, in FIG. 2, as viewed from the axial direction of the pressure sensor accommodating hole 4.

As described above, the motor terminal hole 12 is set in a place (below the pressure accommodating hole 4 in the drawing) avoiding the upper part of the housing 1. Accordingly, the connection of a hydraulic pressure detection point to the pressure sensor accommodating hole 4 can be carried out in the upper part of the housing 1. Accordingly, four points, both upstream and downstream, can easily be selected as hydraulic pressure detection points, using the pressure increase valves in the respective internal channels of the first and second systems as corresponding references.

The internal channels $9\_1$, $9\_2$ are provided such that the incorporated pumps ($25\_1$, $25\_2$, respectively in FIG. 13) and the external pressurizing sources ($22\_1$, $22\_2$, respectively in FIG. 13) individually communicate with the wheel cylinder ($23\_1$ in FIG. 13) for the first wheel and the wheel cylinder ($23\_2$ in FIG. 13) for the second wheel, respectively, via the pressure increase valves ($27\_1$, $27\_2$, respectively, in FIG. 13).

The internal channels $9\_1$, $9\_2$ include the first hole $P\_1$ and the second hole $P\_2$, respectively, shown in FIGS. 1, 2, 6, and 7. The first hole $P\_1$ and the second hole $P\_2$ shown comprise corresponding holes (horizontal holes) connecting the corresponding pressurizing source ports $7\_1$, $7\_2$ and corresponding pump accommodating holes $5\_1$, $5\_2$, respectively, via communication holes $Lp\_1$, $Lp\_2$, respectively, composing the respective discharging ports of the pumps $25\_1$, $25\_2$. The first hole and the second hole $P\_2$ are provided on both sides of the housing 1, opposite each other. The openings of the first hole $P\_1$ and the second hold $P\_2$, or the openings of vertical and horizontal auxiliary holes or the like are closed by plugs, not shown.

The first hole $P\_1$ and the second hole $P\_2$ can be the respective parts of the internal channels $9\_1$, $9\_2$ of the first and second systems respectively and can be composed of corresponding holes, each pair of which connects the following three: the pressure increase valve accommodating hole ($2\_1$, $2\_2$), pressure reduction valve accommodating hole ($3\_1$, $3\_2$), and wheel cylinder port ($8\_1$, $8\_2$). A detailed description of this is given below. In the pressure increase valve accommodating holes $2\_1$, $2\_2$, the respective downstream sides (output sides) of the pressure increase valves, rather than their respective valve portions, are connected to the pressure reduction valve accommodating holes $3\_1$, $3\_2$ respectively.

Also in the aspects in which the first hole and the second hole are composed of either corresponding holes connecting the corresponding pressurizing source ports $7\_1$, $7\_2$, and the respective discharging ports of the corresponding pumps or corresponding holes connecting the corresponding booster and pressure reduction valves and the corresponding wheel cylinder ports $8\_1$, $8\_2$, holes originally required to compose the internal channels $9\_1$, $9\_2$ for the first and second systems respectively can also be used as the first hole and the second hole respectively. Therefore, processing of holes and space for arrangement can be reduced, compared to the form in which dedicated holes are newly provided.

The detected hydraulic pressure inlet hole 10 may be part of the pressure sensor accommodating hole 4 or may be a hole communicating with the pressure sensor accommodating hole 4. The detected hydraulic pressure inlet hole 10 shown includes: a first vertical auxiliary hole 10a that is open in the pressure sensor accommodating hole 4; a second vertical auxiliary hole 10b provided in a position displaced toward the other end face side of the housing 1 from the first vertical auxiliary hole 10a; and a horizontal auxiliary hole 10c extending in the axial direction of the pressure increase valve (pressure increase valve accommodating hole 2), by which the first and second vertical auxiliary holes 10a, 10b communicate.

Figure 3:
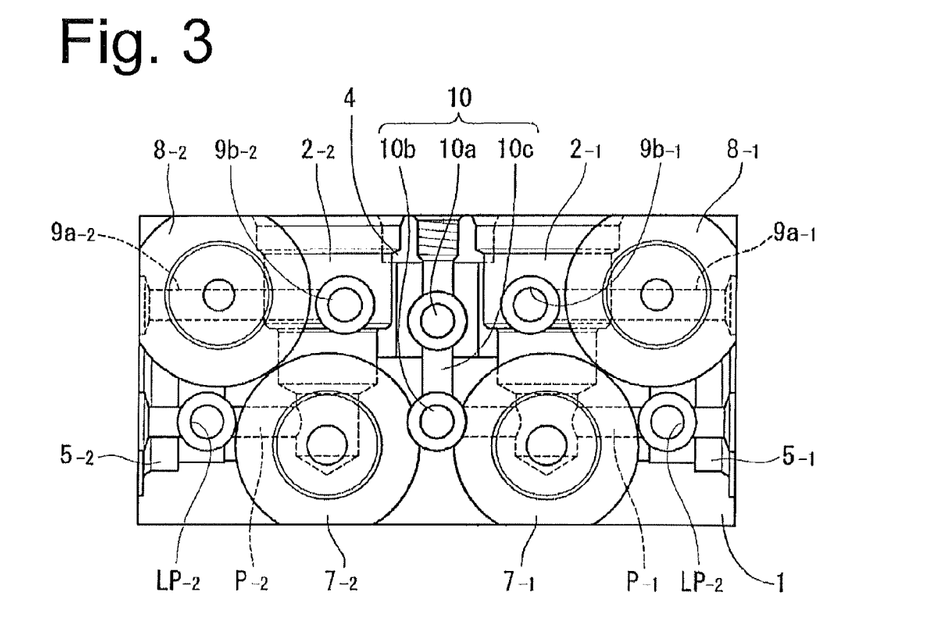
FIG. 3 is a perspective plane view of the housing shown in FIG. 1.
Figure 4:
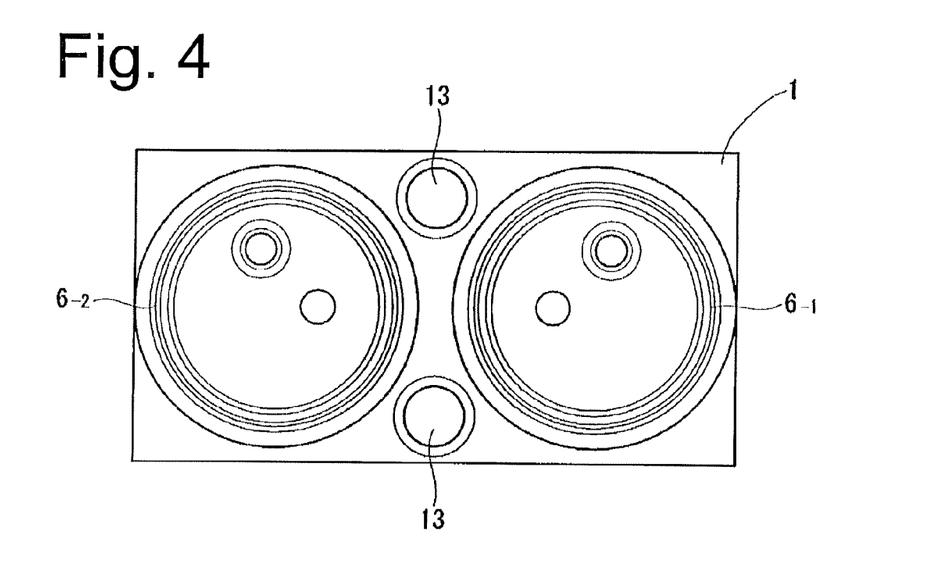
FIG. 4 is a perspective bottom view of the housing shown in FIG. 1.
Figure 5:
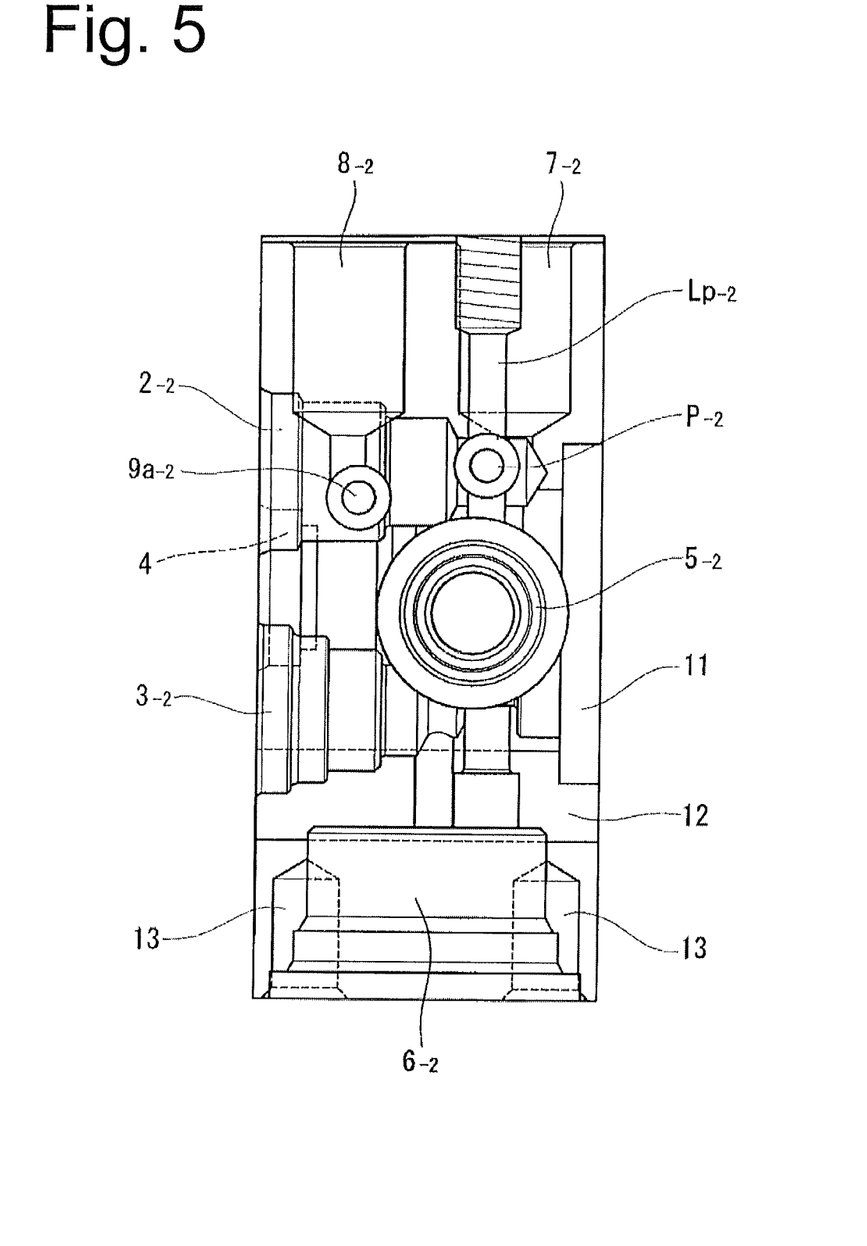
FIG. 5 is a perspective left side view of the housing shown in FIG. 1.
Figure 6:
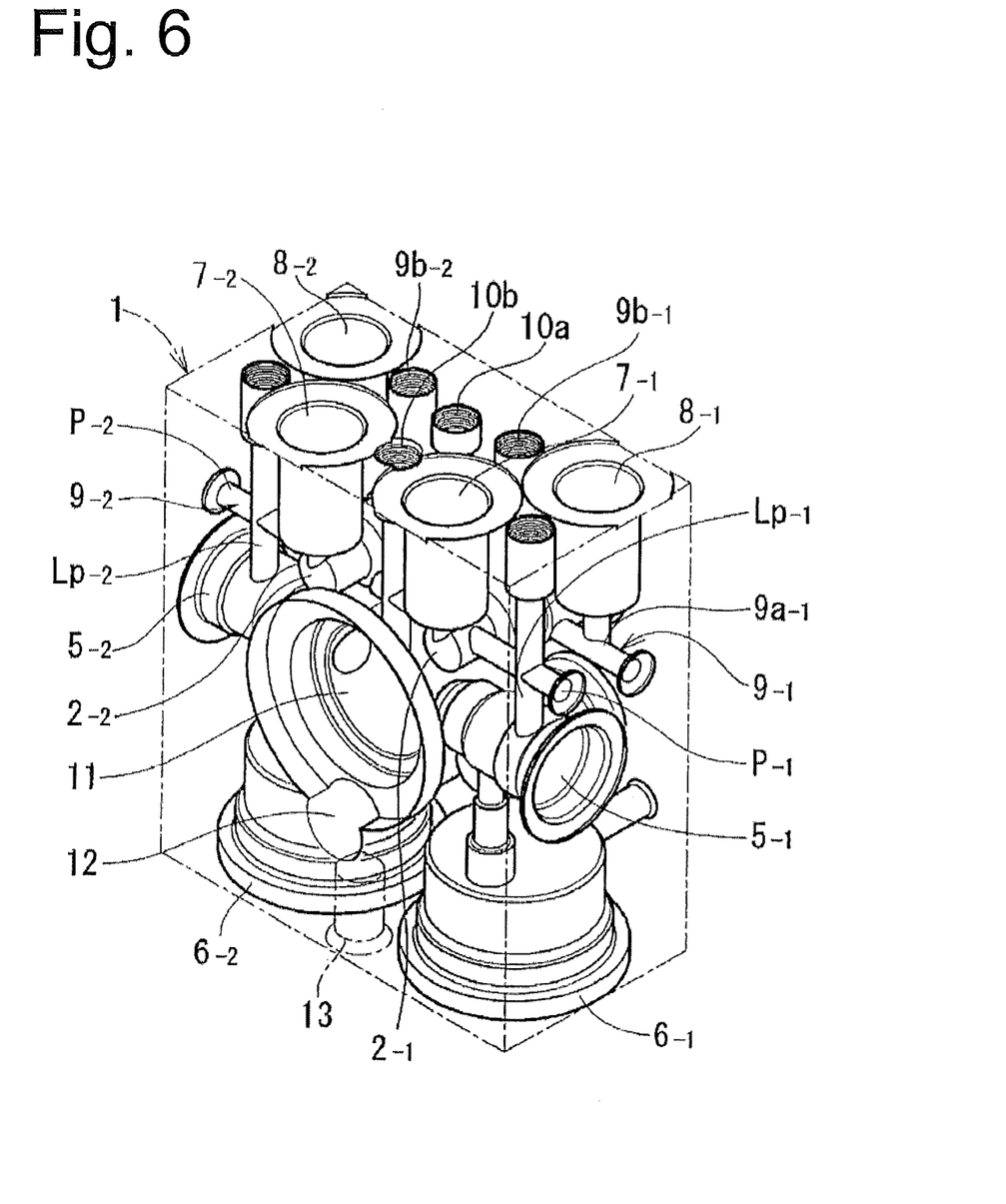
FIG. 6 is a perspective oblique view of the housing shown in FIG. 1.
Figure 7:
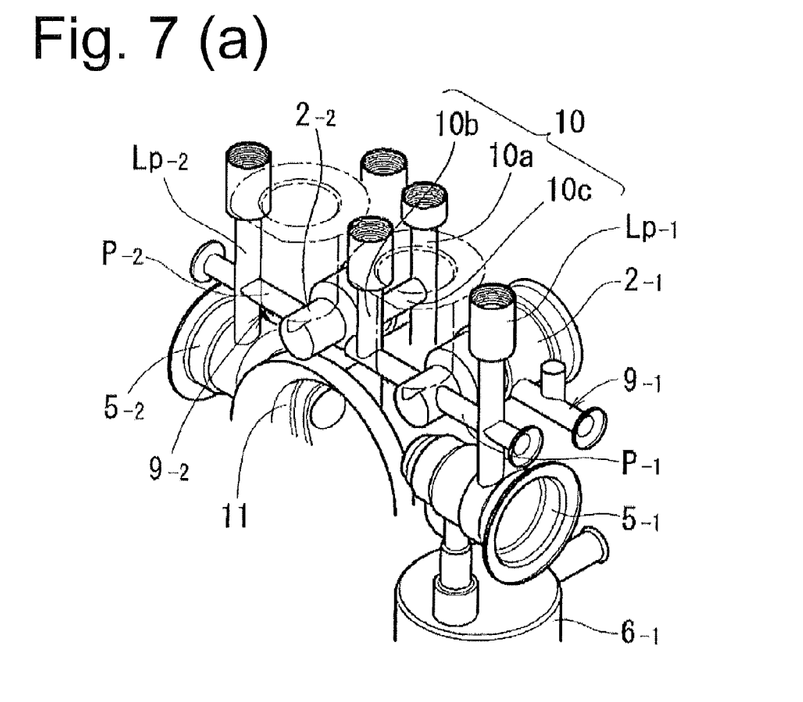
Figure 8:
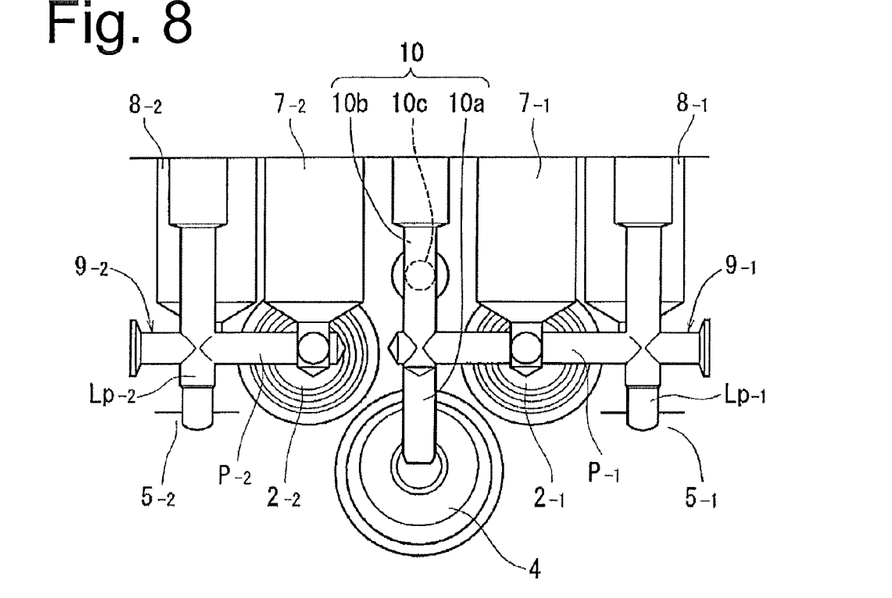
FIG. 8 is a simplified front view of a state in which the detected hydraulic pressure inlet hole is connected to the one pressurizing source port.

In the housing 1 shown, the pressurizing ports $7\_1$, $7\_2$ and wheel cylinder ports $8\_1$, $8\_2$ are arranged so as to be displaced in the respective axial directions of the corresponding pressure increase valves (pressure increase valve accommodating holes $2\_1$, $2\_2$), as shown in FIGS. 3 and 6. Because of this, the pressure sensor accommodating hole 4 is connected, via the horizontal auxiliary hole 10c, to the port (either the pressurizing source port $7\_1$, $7\_2$ in the housing shown) located farther than the other from the opening of the pressure sensor accommodating hole 4 in the axial direction of the pressure increase valve.

Among holes composing the detected hydraulic pressure inlet hole 10, the second vertical auxiliary hole 10b extends vertically across the position where the first hole $P\_1$ and the second hole $P\_2$ meet, or across a line extending from this position. Only the first hole $P\_1$ is allowed to communicate with the second vertical auxiliary hole 10b. At the stage of processing, the housing 1 is kept in the state in which the first hole $P\_1$ does not communicate with the second vertical auxiliary hole 10b, and this first hole $P\_1$ is allowed to communicate with the detected hydraulic pressure inlet hole 10 by increasing the depth of the first hole $P\_1$.

In this case, in the present embodiment, the depth of the first hole $P\_1$ is greater than that of the second hole $P\_2$. This relates to the fact that distances between the detected hydraulic pressure inlet hole 10 and the corresponding side faces of the housing 1 in which the first, second holes $P\_1$, $P\_2$ are provided, are equal. However, the present invention is not limited to such positional relations and depth relations. That is, the present invention includes the aspect in which, of the first and second holes, the depth of the one connected to the detected hydraulic pressure inlet hole 10 is less than the depth of the other not connected thereto. An example of such an aspect is a case where the distances between the detected hydraulic pressure inlet hole 10 and the corresponding side faces are different.

Figure 9:
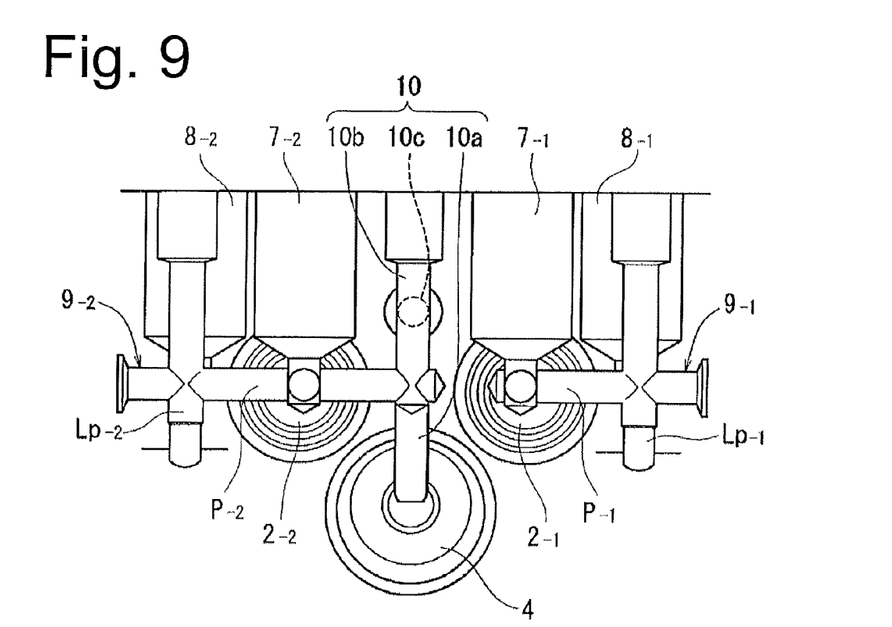
FIG. 9 is a simplified front view of a state in which the detected hydraulic pressure inlet hole is connected to the other pressurizing source port.

When brake fluid pressure for the second system requires detection by the pressure sensor on the upstream side (on the pressurizing source port $7\_2$ side) of the internal channel $9\_2$ from the pressure increase valve accommodating hole $2\_2$, the depth of the second hole $P\_2$ is made greater than that of the first hole $P\_1$, for example, as shown in FIG. 9, thereby allowing only the second hole $P\_2$ to communicate with the detected hydraulic pressure inlet hole 10. As stated above, the depth relation between the first hole $P\_1$ and the second hole $P\_2$ is not limited thereto.

Figure 10:
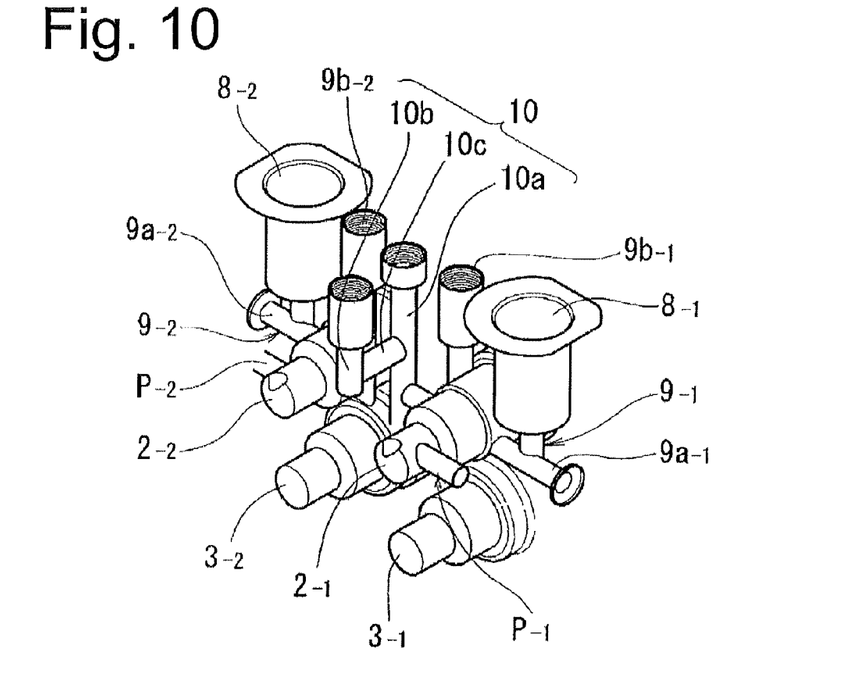
FIG. 10 is an oblique view of a principal part in which the detected hydraulic pressure inlet hole is connected to one wheel cylinder port, as viewed from the motor mounting hole side.
Figure 11:
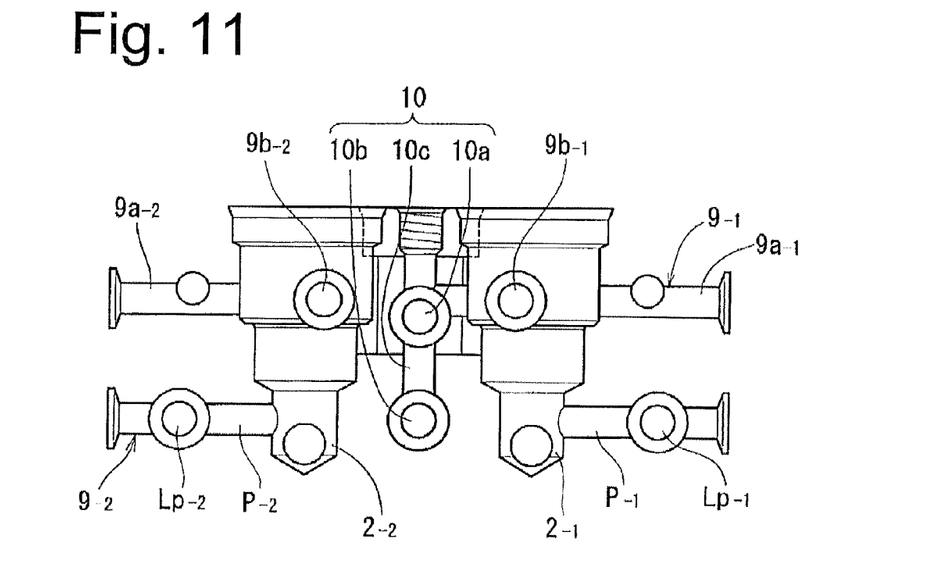
FIG. 11 is a plane view of the principal part in which the detected hydraulic pressure inlet hole is connected to the one wheel cylinder port.
Figure 12:
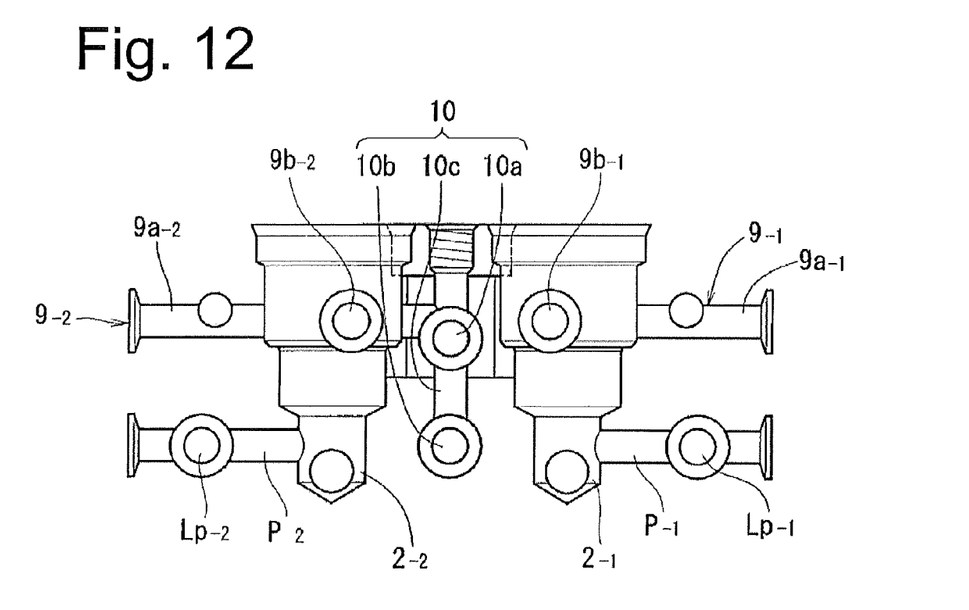
FIG. 12 is a plane view of a principal part in which the detected hydraulic pressure inlet hole is connected to the other wheel cylinder port.
Figure 13:
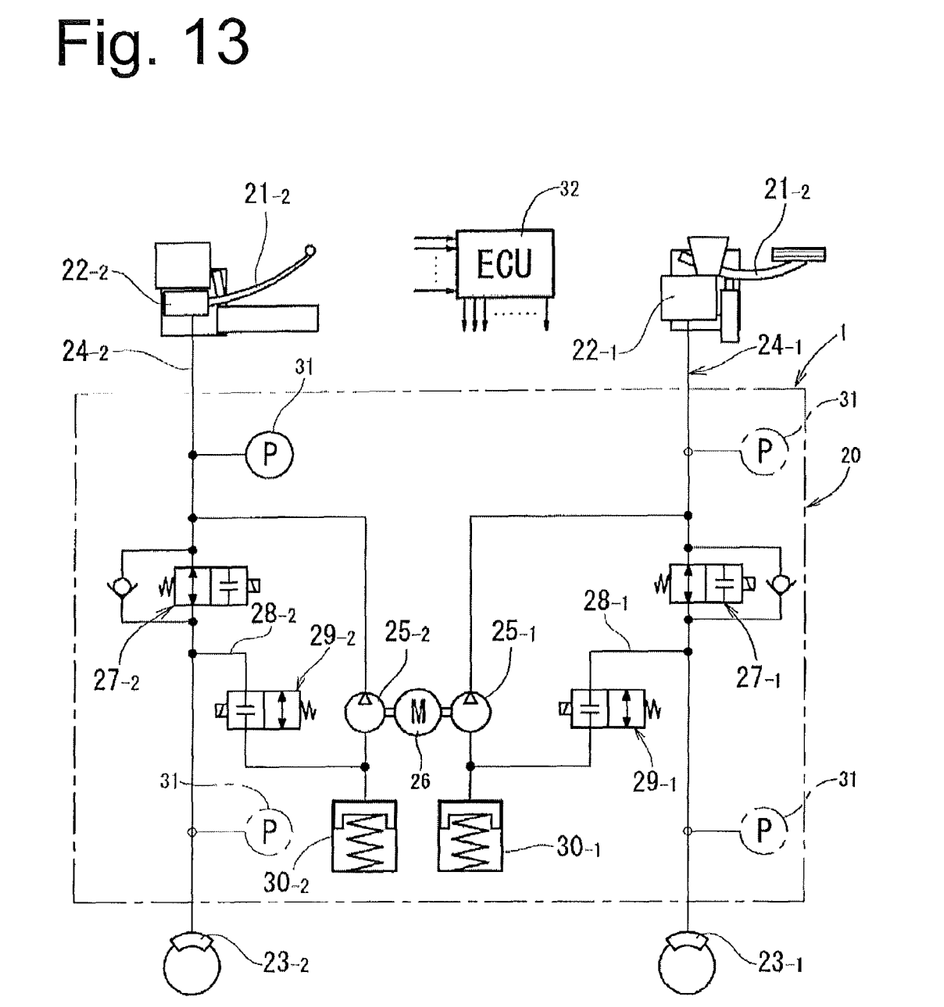
FIG. 13 is a view of an example of a circuit configuration for a brake fluid pressure control unit for a two-wheeled vehicle.

Similarly, when a brake fluid pressure for the first system requires detection by the pressure sensor on the downstream side (the wheel cylinder port $8\_1$ side) of the internal channel $9\_1$ from the pressure increase valve accommodating hole $2\_1$, part of the hole connecting the pressure increase valve (pressure increase valve accommodating hole $2\_1$), pressure reduction valve (pressure reduction valve accommodating hole $3\_1$), and wheel cylinder port $8\_1$ is used as the first hole and allowed to communicate with the detected hydraulic pressure inlet hole 10, as shown in FIGS. 10 to 12.

That is, the wheel cylinder port $8\_1$ and pressure increase valve accommodating hole $2\_1$ are allowed to communicate via a horizontal communication hole $9a\_1$ provided as part of the internal channel $9\_1$ of the first system. Also, the pressure increase valve accommodating hole $2\_1$ and the pressure reduction valve accommodating hole $3\_1$ are also allowed to communicate via a vertical communication hole $9b\_1$ provided as part of the internal channel. The horizontal communication hole $9a\_1$ allows the communication between the wheel cylinder port $8\_1$ and the vertical communication hole $9b\_1$.

In this structure, as shown in FIGS. 10 and 11, the first vertical auxiliary hole 10a of the detected hydraulic pressure inlet hole 10 is located on a line extending from the communication hole $9a\_2$ provided opposite the communication hole $9a\_1$. Therefore, using this communication hole $9a\_2$ and the other communication hole $9a\_1$ as the second and first holes respectively, the depth of the communication hole $9a\_1$ is extended to the place where the communication hole $9a\_1$ meets the first vertical auxiliary hole 10a, thus enabling the communication hole $9a\_1$ to communicate with the detected hydraulic pressure inlet hole 10. As stated above, the depth relation between the communication hole $9a\_1$, i.e., the first hole, and the communication hole $9a\_2$, i.e., the second hole, is not limited to this. Additionally, in this case, liquid detection with the pressure sensor 31 is not carried out on the upstream side (pressurizing source port side) of the internal channel from the pressure increase valve accommodating hole. Therefore, among the holes composing the detected hydraulic pressure inlet hole 10, the second vertical auxiliary hole 10b and horizontal auxiliary hole 10c may be omitted.

The foregoing also applies in a case requiring a structure in which the brake fluid pressure for the second system be detected by the pressure sensor on the downstream side of the internal channel $9\_2$ from the pressure increase valve. As shown in FIG. 12, using, as the second hole, the horizontal communication hole $9a\_2$ connecting the following three, i.e., the pressure increase valve (pressure increase valve accommodating hole $2\_2$) of the second system, the pressure reduction valve (pressure reduction valve accommodating hole $3\_2$), and the wheel cylinder port $8\_2$, the communication hole $9a\_2$ is able to communicate with the detected hydraulic pressure inlet hole 10.

Specifically, the horizontal communication hole $9a\_2$ connecting the wheel cylinder port $8\_2$ and the vertical communication hole $9b\_2$ that allows communication between the pressure increase valve accommodating hole $2\_2$ and pressure reduction valve accommodating hole $3\_2$ is rendered greater in depth than the horizontal communication hole $9a\_1$ provided opposite the horizontal communication hole $9a\_2$. Thereby, the horizontal communication hole $9a\_2$ is allowed to communicate with the first vertical auxiliary hole 10a of the detected hydraulic pressure inlet hole 10. As stated above, the depth relation between the communication hole $9a\_1$, i.e., the first hole, and the communication hole $9a\_2$, i.e., the second hole, is not limited to this. Also as stated above, the second vertical auxiliary hole 10b and horizontal auxiliary hole 10c can be omitted.

As described above, the present invention is able to standardize the housings 1 for the hydraulic blocks into one type at the stage of processing. Thus, specifications for the housings are standardized, thus enabling common machining, which achieves improved productivity and a cost reduction.

In FIG. 2 as viewed from the respective axial directions of the pressure increase valves (pressure increase valve accommodating holes), the horizontal auxiliary hole 10c described above is located away from the imaginary straight line L1 connecting the respective centers of the pressure increase valve accommodating holes $2\_1$, $2\_2$ of the first system and the second system respectively (i.e., avoiding the space between the pressure increase valve accommodating holes $2\_1$, $2\_2$, as much as possible).

The positions of the pressure increase valve accommodating holes $2\_1$, $2\_2$ and the positions of the pressure reduction valve accommodating holes $3\_1$, $3\_2$ may be exchanged, in which case, it is preferable to locate the horizontal auxiliary hole 10c away from the imaginary straight line L2 connecting the respective centers of the pressure reduction valve accommodating holes $3\_1$, $3\_2$. These structures make it possible to dispose the pressure increase valve accommodating holes $2\_1$, $2\_2$ close to each other (as with the pressure reduction valves), contributing to a reduction in the size of each housing 1.

A numeral symbol 14 in each of FIGS. 1 and 2 represents a mounting hole used for mounting the brake fluid pressure control unit 20 into the vehicle.

A description has been given using, as an example, a brake fluid pressure control unit for a two-wheeled vehicle. However, the present invention can also be applied in a brake fluid pressure control unit for a four-wheeled vehicle. In the four-wheeled vehicle, either the left and right front wheels or the left and right rear wheels or either the right front wheel and the left rear wheel or the left front wheel and the right rear wheel are assumed as the first wheels referred to in the present invention, and the other, as the second wheels. The first wheels and second wheels are mounted as the independent first and second systems, thus making it possible to standardize housings for corresponding hydraulic blocks at the stage of processing. In the brake fluid pressure control unit for a four-wheeled vehicle, a tandem master cylinder is employed as an external pressurizing source. Additionally, for configurations that independently control corresponding wheels, four accommodating holes for pressure increase valves, four accommodating holes for pressure reduction valves, four wheel cylinder ports, and so on, are provided in the housings 1.

DESCRIPTION OF REFERENCE SIGNS

1 Housing
$2\_1$, $2\_2$ Pressure increase valve accommodating hole
$3\_1$, $3\_2$ Pressure reduction valve accommodating hole
4 Pressure sensor accommodating hole
$5\_1$, $5\_2$ Pump accommodating hole
$6\_1$, $6\_2$ Reservoir installation hole
$7\_1$, $7\_2$ Pressurizing source port
$8\_1$, $8\_2$ Wheel cylinder port
$9\_1$ Internal channel for first system
$P\_1$ First hole
$P\_2$ Second hole
$9a\_1$, $9a\_2$ Horizontal communication hole
$9b\_1$, $9b\_2$ Vertical communication hole Lp_1, Lp_2 Communication hole
9_2 Internal channel for second system
10 Detected hydraulic pressure inlet hole
10a First vertical auxiliary hole
10b Second vertical auxiliary hole
10c Horizontal auxiliary hole
11 Motor mounting hole
12 Motor terminal hole
13 Damper composing hole
14 Control unit mounting hole
20 Brake fluid pressure control unit
20_1, 21_2 Brake lever
22_1, 22_2 Pressurizing source
23_1, 23_2 Wheel cylinder
24_1 Hydraulic passage for first hydraulic system
24_2 Hydraulic passage for second hydraulic system
25_1, 25_2 Pump
26 Motor
27_1, 27_2 Pressure increase valve
28_1, 28_2 Discharging passage
29_1, 29_2 Pressure reduction valve
30_1, 30_2 Reservoir
31 Pressure sensor
32 Electronic control unit

The invention claimed is:

1. A brake fluid pressure control unit for a vehicle, the unit comprising:
a hydraulic block that includes a housing containing an internal channel for a first system and an internal channel for a second system by which incorporated pumps and corresponding external pressurizing sources are configured to individually communicate with a wheel cylinder for a first wheel and a wheel cylinder for a second wheel, respectively, via corresponding pressure increase valves, and a detected hydraulic pressure inlet hole leading to a pressure receiving part of a pressure sensor, wherein the internal channel for the first system and the internal channel for the second system can be selectively connected to the detected hydraulic pressure inlet hole by machining either one of first and second holes of the corresponding internal channels to a depth greater than the other, wherein the housing has, in one end face thereof, pressure increase valve accommodating holes, pressure reduction valve accommodating holes, and a pressure sensor accommodating hole, and has, in both side faces thereof, two opposite pump accommodating holes, wherein the housing also has, in a lower face thereof, reservoir installation holes that receive corresponding brake fluids discharged from the corresponding wheel cylinders via the corresponding pressure reduction valves and that supply the brake fluids to the corresponding pumps, and has, in an upper face thereof, pressurizing source ports that connect to the corresponding external pressurizing sources, and wheel cylinder ports that individually connect to the corresponding wheel cylinders for the first wheel and the second wheel respectively, wherein the first hole and the second hole are provided opposite each other in both side faces of the housing, wherein the detected hydraulic pressure inlet hole is disposed so as to meet either the first hole or the second hole and vertically cross a line extending from the other, and wherein the first hole and the second hole are each composed of corresponding holes connecting the corresponding pressurizing source ports and the respective discharging ports of the corresponding pumps.

2. A brake fluid pressure control unit for a vehicle, the unit comprising:
a hydraulic block that includes a housing containing an internal channel for a first system and an internal channel for a second system by which incorporated pumps and corresponding external pressurizing sources are configured to individually communicate with a wheel cylinder for a first wheel and a wheel cylinder for a second wheel, respectively, via corresponding pressure increase valves, and also containing a detected hydraulic pressure inlet hole leading to a pressure receiving part of a pressure sensor, wherein the internal channel for the first system and the internal channel for the second system can be selectively connected to the detected hydraulic pressure inlet hole by machining either one of the first and second holes of the corresponding internal channels to a depth greater than the other, wherein the housing has, in one end face thereof, pressure increase valve accommodating holes, pressure reduction valve accommodating holes, and a pressure sensor accommodating hole, and has, in both side faces thereof, two opposite pump accommodating holes, wherein the housing has, in a lower face thereof, reservoir installation holes that receive corresponding brake fluids discharged from the corresponding wheel cylinders via the corresponding pressure reduction valves and that supply the brake fluids to the corresponding pumps, and has, in an upper face thereof, pressurizing source ports that connect to the corresponding external pressurizing sources, and wheel cylinder ports that individually connect to the corresponding wheel cylinders for the first wheel and the second wheel respectively, wherein the first hole and the second hole are provided opposite each other in both side faces of the housing, and wherein the detected hydraulic pressure inlet hole is disposed so as to meet either the first hole or the second hole and vertically cross a line extending from the other, and wherein the first hole and second hole are each composed of corresponding holes connecting the corresponding pressure increase valves, the corresponding pressure reduction valves, and the corresponding wheel cylinder ports.

3. A brake fluid pressure control unit for a vehicle, the unit comprising: a hydraulic block that includes a housing containing an internal channel for a first system and an internal channel for a second system by which incorporated pumps and corresponding external pressurizing sources are configured to individually communicate with a wheel cylinder for a first wheel and a wheel cylinder for a second wheel, respectively, via corresponding pressure increase valves, and containing a detected hydraulic pressure inlet hole leading to a pressure receiving part of a pressure sensor, wherein the detected hydraulic pressure inlet hole meets either a first hole composing part of the internal channel for the first system or a second hole composing part of the internal channel for the second system, and is disposed on a line extending from the other, thereby connecting only one of the first hole and the second hole to the detected hydraulic pressure inlet hole, wherein the housing has, in one end face thereof, pressure increase valve accommodating holes, pressure reduction valve accommodating holes, and a pressure sensor accommodating hole, and has, in both side faces thereof, two opposite pump accommodating holes, wherein the housing has, in a lower face thereof, reservoir installation holes that receive corresponding brake fluids discharged from the corresponding wheel cylinders via the corresponding pressure reduction valves and that supply the brake fluids to the corresponding pumps, and has, in an upper face thereof, pressurizing source ports that connect to the corresponding external pressurizing sources, and wheel cylinder ports that individually connect to the corresponding wheel cylinders for the first wheel and the second wheel respectively, wherein the first hole and the second hole are provided opposite each other in both side faces of the housing, wherein the detected hydraulic pressure inlet hole is disposed so as to meet either the first hole or the second hole and vertically cross a line extending from the other, and wherein the first hole and the second hole are each composed of corresponding holes connecting the corresponding pressurizing source ports and the respective discharging ports of the corresponding pumps.

4. A brake fluid pressure control unit for a vehicle, the unit comprising: a hydraulic block that includes a housing containing an internal channel for a first system and an internal channel for a second system by which incorporated pumps and corresponding external pressurizing sources are configured to individually communicate with a wheel cylinder for a first wheel and a wheel cylinder for a second wheel, respectively, via corresponding pressure increase valves, and containing a detected hydraulic pressure inlet hole leading to a pressure receiving part of a pressure sensor, wherein the detected hydraulic pressure inlet hole meets either a first hole composing part of the internal channel for the first system or a second hole composing part of the internal channel for the second system, and is disposed on a line extending from the other, thereby connecting only one of the first hole and the second hole to the detected hydraulic pressure inlet hole, wherein the housing has, in one end face thereof, pressure increase valve accommodating holes, pressure reduction valve accommodating holes, and a pressure sensor accommodating hole, and has, in both side faces thereof, two opposite pump accommodating holes, wherein the housing has, in a lower face thereof, reservoir installation holes that receive corresponding brake fluids discharged from the corresponding wheel cylinders via the corresponding pressure reduction valves and that supply the brake fluids to the corresponding pumps, and has, in an upper face thereof, pressurizing source ports that connect to the corresponding external pressurizing sources, and wheel cylinder ports that individually connect to the corresponding wheel cylinders for the first wheel and the second wheel respectively, wherein the first hole and the second hole are provided opposite each other in both side faces of the housing, wherein the detected hydraulic pressure inlet hole is disposed so as to meet either the first hole or the second hole and vertically cross a line extending from the other, and wherein the first hole and second hole are each composed of corresponding holes connecting the corresponding pressure increase valves, the corresponding pressure reduction valves, and the corresponding wheel cylinder ports.

5. The brake fluid pressure control unit for a vehicle, according to claim 1, wherein the pressurizing source ports and the wheel cylinder ports are configured to be displaced in the respective axial directions of the corresponding pressure increase valves, and wherein, of the pressurizing source ports and wheel cylinder ports, the ports located farther than the others from an opening of the pressure sensor accommodating hole in the axial directions of the corresponding pressure increase valves are connected to the pressure sensor accommodating hole via a horizontal auxiliary hole extending in the axial directions of the corresponding pressure increase valves, which hole is included in the detected hydraulic pressure inlet hole.

6. The brake fluid pressure control unit for a vehicle, according to claim 5, wherein the horizontal auxiliary hole is located away from an imaginary straight line connecting the respective centers of the pressure increase valve accommodating holes of the first system and second system respectively when viewed from the respective axial directions of the pressure increase valves, or an imaginary straight line connecting the respective centers of the pressure reduction valve accommodating holes of the first system and the second system respectively.

7. The brake fluid pressure control unit for a vehicle, according to claim 1, wherein a motor terminal hole through which a motor terminal is extended from an electronic control unit, which is attached to one face of the housing, to a motor for driving the pumps, which is attached to the other face thereof, extends from the one face to the other of the housing, and wherein the motor terminal hole is disposed opposite the side where the detected hydraulic pressure inlet hole, the first hole, and the second hole are located using the pressure sensor accommodating hole as a position reference, when viewed from the axial direction of the pressure sensor accommodating hole.

8. The brake fluid pressure control unit for a vehicle, according to claim 2, wherein the pressurizing source ports and the wheel cylinder ports are configured to be displaced in the respective axial directions of the corresponding pressure increase valves, and wherein, of the pressurizing source ports and wheel cylinder ports, the ports located farther than the others from an opening of the pressure sensor accommodating hole in the axial directions of the corresponding pressure increase valves are connected to the pressure sensor accommodating hole via a horizontal auxiliary hole extending in the axial directions of the corresponding pressure increase valves, which hole is included in the detected hydraulic pressure inlet hole.

9. The brake fluid pressure control unit for a vehicle, according to claim 8, wherein the horizontal auxiliary hole is located away from an imaginary straight line connecting the respective centers of the pressure increase valve accommodating holes of the first system and second system respectively when viewed from the respective axial directions of the pressure increase valves, or an imaginary straight line connecting the respective centers of the pressure reduction valve accommodating holes of the first system and the second system respectively.

10. The brake fluid pressure control unit for a vehicle, according to claim 2, wherein a motor terminal hole through which a motor terminal is extended from an electronic control unit, which is attached to one face of the housing, to a motor for driving the pumps, which is attached to the other face thereof, extends from the one face to the other of the housing, and wherein the motor terminal hole is disposed opposite the side where the detected hydraulic pressure inlet hole, the first hole, and the second hole are located using the pressure sensor accommodating hole as a position reference, when viewed from the axial direction of the pressure sensor accommodating hole.

11. The brake fluid pressure control unit for a vehicle, according to claim 3, wherein the pressurizing source ports and the wheel cylinder ports are configured to be displaced in the respective axial directions of the corresponding pressure increase valves, and wherein, of the pressurizing source ports and wheel cylinder ports, the ports located farther than the others from an opening of the pressure sensor accommodating hole in the axial directions of the corresponding pressure increase valves are connected to the pressure sensor accommodating hole via a horizontal auxiliary hole extending in the axial directions of the corresponding pressure increase valves, which hole is included in the detected hydraulic pressure inlet hole.

12. The brake fluid pressure control unit for a vehicle, according to claim 11, wherein the horizontal auxiliary hole is located away from an imaginary straight line connecting the respective centers of the pressure increase valve accommodating holes of the first system and second system respectively when viewed from the respective axial directions of the pressure increase valves, or an imaginary straight line connecting the respective centers of the pressure reduction valve accommodating holes of the first system and the second system respectively.

13. The brake fluid pressure control unit for a vehicle, according to claim 3, wherein a motor terminal hole through which a motor terminal is extended from an electronic control unit, which is attached to one face of the housing, to a motor for driving the pumps, which is attached to the other face thereof, extends from the one face to the other of the housing, and wherein the motor terminal hole is disposed opposite the side where the detected hydraulic pressure inlet hole, the first hole, and the second hole are located using the pressure sensor accommodating hole as a position reference, when viewed from the axial direction of the pressure sensor accommodating hole.

14. The brake fluid pressure control unit for a vehicle, according to claim 4, wherein the pressurizing source ports and the wheel cylinder ports are configured to be displaced in the respective axial directions of the corresponding pressure increase valves, and wherein, of the pressurizing source ports and wheel cylinder ports, the ports located farther than the others from an opening of the pressure sensor accommodating hole in the axial directions of the corresponding pressure increase valves are connected to the pressure sensor accommodating hole via a horizontal auxiliary hole extending in the axial directions of the corresponding pressure increase valves, which hole is included in the detected hydraulic pressure inlet hole.

15. The brake fluid pressure control unit for a vehicle, according to claim 14, wherein the horizontal auxiliary hole is located away from an imaginary straight line connecting the respective centers of the pressure increase valve accommodating holes of the first system and second system respectively when viewed from the respective axial directions of the pressure increase valves, or an imaginary straight line connecting the respective centers of the pressure reduction valve accommodating holes of the first system and the second system respectively.

16. The brake fluid pressure control unit for a vehicle, according to claim 4, wherein a motor terminal hole through which a motor terminal is extended from an electronic control unit, which is attached to one face of the housing, to a motor for driving the pumps, which is attached to the other face thereof, extends from the one face to the other of the housing, and wherein the motor terminal hole is disposed opposite the side where the detected hydraulic pressure inlet hole, the first hole, and the second hole are located using the pressure sensor accommodating hole as a position reference, when viewed from the axial direction of the pressure sensor accommodating hole.

* * * * *